May 12, 1931.  H. G. ULLMAN  1,805,321
PIPE COUPLING OR CONNECTION
Filed Sept. 14, 1927
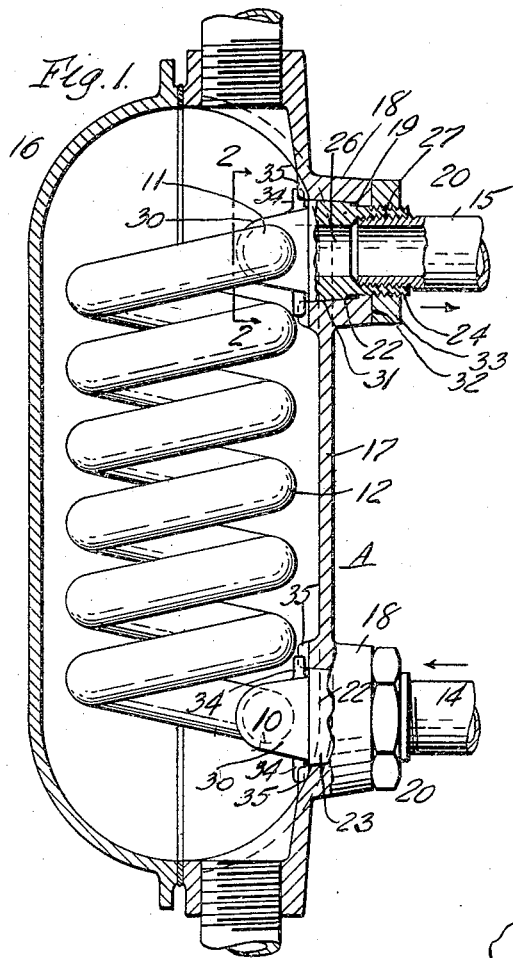
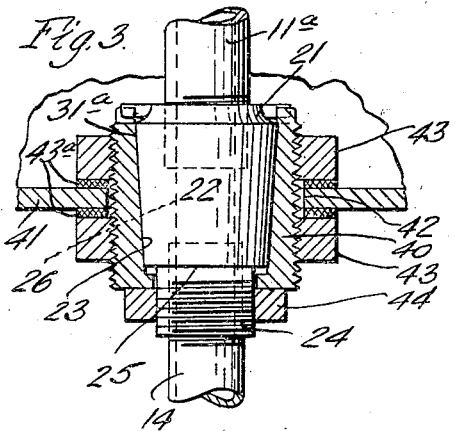
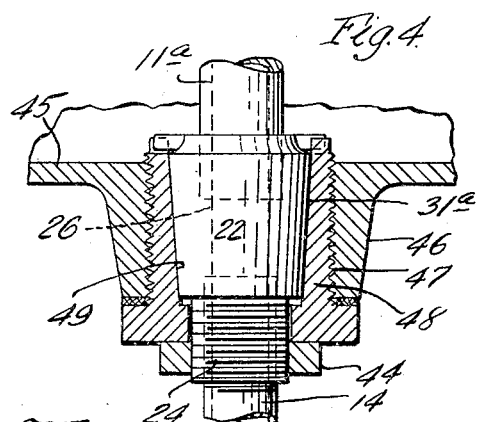
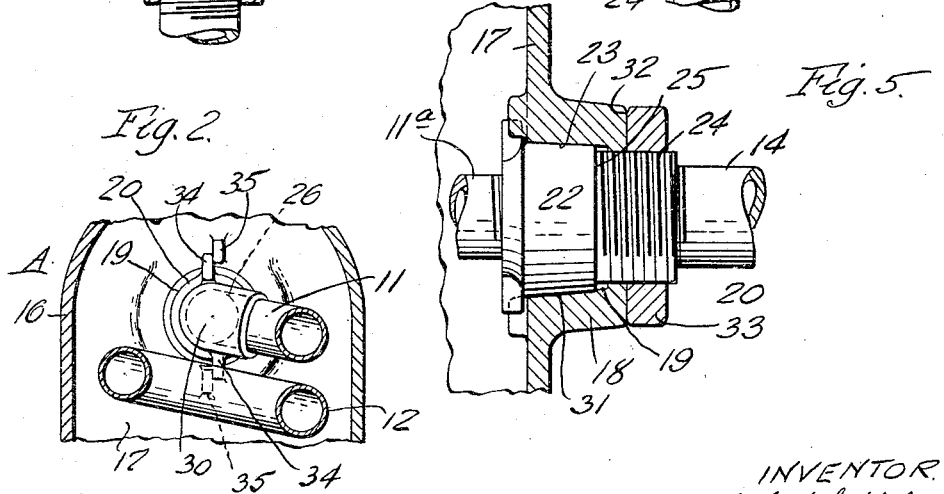
INVENTOR.
Herbert G. Ullman
by Parker & Prochnow
ATTORNEYS.

Patented May 12, 1931

1,805,321

UNITED STATES PATENT OFFICE

HERBERT G. ULLMAN, OF TUCKAHOE, NEW YORK

PIPE COUPLING OR CONNECTION

Application filed September 14, 1927. Serial No. 219,455.

This invention relates to improvements in couplings or connecting devices which are used for connecting the ends of two pipes or members disposed on opposite sides of a wall or member, such as of a vessel or the like, and in an opening in which the coupling is received, and acts to seal said opening, or provide a liquid tight joint between said wall and said coupling.

The principal object of the invention is to provide an improved, simple and practical coupling of the character stated, consisting of the minimum number of parts, and which can be produced at low cost.

Other objects are to provide a coupling of this sort which can be easily and quickly assembled or attached to the respective pipes or members and to the desired wall or vessel and readily taken apart or detached; also to construct a coupling whereby the aforesaid attaching and detaching operations can be performed from the outside of the vessel by the manipulation of a single part; also to provide a pipe coupling which is particularly adapted for use in heat interchange devices for connecting the coil or other inner member with the supply and discharge pipes or other outside members and whereby the coupling will act to provide a fluid tight joint between the latter and the wall of the device when subjected to pressure, and to withstand the strains caused by temperature changes therein.

Other objects are to improve and simplify pipe couplings or connecting devices in the other respects hereinafter set forth and claimed.

In the accompanying drawings,

Fig. 1 shows two of my improved pipe couplings or connecting devices, one in longitudinal section, and the other in elevation, as used for securing inlet and discharge pipes to the opposite ends of the coil of a heat exchange device.

Fig. 2 is an end elevation of the upper coupling of Fig. 1, on line 2—2 of that view.

Fig. 3 is a longitudinal sectional elevation of a coupling or connection arranged in a seat or support of slightly modified form.

Fig. 4 is a similar view of another slightly modified form of seat or support for the coupling.

Fig. 5 is a sectional elevation, showing the coupling device of Fig. 1 connecting the ends of two axially alined pipes.

In Figs. 1 and 2 the improved pipe coupling or connecting device embodying my invention is employed for the purpose of coupling the opposite ends 10 and 11 of a coil 12 of a water heater A, with the inlet and discharge pipes 14 and 15 respectively. The coil 12 is arranged within the heater casing 16 which includes the usual relatively thin side wall 17. This wall 17 has formed thereon two integral, outwardly projecting, apertured bosses 18, through which the connections between the coil 12 and the pipes 14 and 15 are made. These connections are effected by means of the coupling devices 20 which are formed to fit and be supported in the apertures or holes 19 in said bosses 18.

In the various applications of the invention shown, the improved coupling device 20 comprises a plug or member having a portion 22 adjacent one end formed with an annular tapered outer face 23, and extending preferably from the smaller end of this tapered portion is an axially alined threaded shank 24, the threads of which terminate at the opposite end of the plug. A transverse annular shoulder 25 is preferably, though not necessarily, formed between the parts 22 and 24.

The plug is bored lengthwise to form a passage 26 extending from one end thereof to the other, and the outer portion of this passage, that is that portion within the threaded part 24, is threaded, as at 27 for the reception of the threaded end of the pipe 14 or 15, or other feed or discharge member.

In Figs. 1 and 2 the ends of the coil 12 approach the couplings 20 in a direction transversely of their length, and in order to secure these ends to said couplings, each plug is provided with an elbow or projection 30 extending from the part 22 and through which the adjacent end of the passage 26 is continued. The ends of the coil are secured in the open, transverse end of the passage in any suitable manner, as by brazing, communication between the coil and the pipes 14 and 15 being thus effected. The construction shown in Fig. 5 is the same as that just described, except that the end 11a of a pipe, coil or other member is arranged in axial alinement with the coupling 20 and is secured directly in the tapered part 22, the adjacent end of the passage 26 being threaded for this purpose. Similar pipes or members 11a are also shown in Figs. 3 and 4, but obviously an elbow or projection similar to the elbow 30 of Figs. 1 and 2 could be employed with these constructions.

In Figs. 1, 2 and 5 the aperture 19 of each boss 18 is tapered or formed with an annular face or seat 31 which is complementary to the tapered part 22 of the coupling, and the outer end or extremity of the boss is formed with a transverse flat face or shoulder 32. After the plug is inserted into its seat 31, the plug is drawn tightly into place by means of a nut or equivalent securing member 33 screwed on the threaded part 24 and which bears against said shoulder 32.

Preferably the plug or member 21 is provided with lateral lugs or parts 34 which engage corresponding stationary lugs or shoulders 35 formed or secured on the side wall 17 of the heater adjacent the opening 19, to prevent rotation of the coupling when the nut 33 is tightened up, or released.

In the construction shown in Fig. 3 the seat 31a for the reception of the tapered part 22 of the coupling is formed in a separate or removable cylindrical bushing or member 40, which is formed by attaching the coupling to a relatively thin wall or shell 41 and which latter is not provided integral with bosses for the purpose. The shell is apertured at 42 and through which aperture the bushing extends, and the periphery of the latter is threaded for the reception of a pair of lock nuts 43, one of which is applied to the threaded bushing at each side of said wall and bears against the shell, or, if desired, against packing washers 43a interposed between said parts. The plug is secured by a nut 44, which in this case bears against the outer end of said bushing.

Another alternative construction is shown in Fig. 4, wherein the thin shell or wall 45 of the heater or other device is provided with an integral boss 46, similar to the bosses 18 of Figs. 1 and 5, and which has a threaded aperture 47 for the reception of a complementarily threaded bushing 48. The bushing, in turn has a tapered seat 49 in which the plug of the coupling fits. A securing nut 44 is also used in this form, and bears against the end of the bushing, as in Fig. 3. The complementary holding lugs 34 and 35 are also preferably used in connection with the forms illustrated in Figs. 3 and 4.

The use of a bushing is particularly useful where it is desired to connect the pipes or coils to a wall where the inner face of the latter is not so readily accessible for inserting the plug from the inside of the structure. In such cases the plug can be inserted into the hole from the outside before the bushing is secured.

The pipe coupling or connecting device described, is simple and inexpensive, consists of relatively few parts, and can be quickly secured or released by the manipulation of the securing nut.

The invention, however, is not limited to the exact form disclosed, as various modifications could be made without departing from the scope of the appended claims.

I claim as my invention:—

1. In a coupling device for securing the ends of two pipes to the opposite sides of the wall of a chamber in which one of said pipes is so arranged that its end is disposed in lateral relation to said coupling device and wherein said wall is formed with an opening through which said device extends, the combination of a tapered plug having a passage extending lengthwise therethrough and to the outer end of which said other pipe is connected, a tapered seat extending axially of the opening of said wall and into which said tapered plug fits with its ends disposed at opposite sides of said wall, a transverse face arranged exteriorly of said opening at the outer side of the said casing, a threaded member engaging a correspondingly threaded part of said plug and bearing against said face to draw said plug into and hold the same in said seat, and an integral enlargement on the inner end of said plug and having a lateral opening which is continuous with said passage and into which said laterally approaching end of said first pipe is secured.

2. In a coupling device for securing the ends of two pipes to the opposite sides of the wall of a chamber in which one of said pipes is so arranged that its end is disposed in lateral relation to said coupling device and wherein said wall is formed with an opening through which said device extends, the combination of a tapered plug having a passage extending lengthwise therethrough and to the outer end of which said other pipe is connected, a tapered seat extending axially of the opening of said wall and into which said tapered plug fits with its ends disposed at opposite sides of said wall, a transverse face arranged at the outer side of said opening, a threaded member engaging a correspondingly threaded part of said plug and bearing against said face to draw said plug into and hold the same in said seat, an integral enlargement on the inner end of said plug and having a lateral opening which is continuous with said passage and into which said laterally approaching end of said first pipe is secured, said connection having diametrically opposed projections at the inner side of said wall at opposite sides of said opening and corresponding lateral lugs on said plug engageable with said projections to prevent said plug from turning when said threaded member is turned thereon.

HERBERT G. ULLMAN.